Patented Nov. 29, 1938

2,138,572

UNITED STATES PATENT OFFICE 2,138,572

DYEING AND PRINTING COMPOSITIONS

Robert E. Etzelmiller, South Milwaukee, Wis., assignor to E. I. Du Pont de Nemours & Company, Wilmington, Del., a corporation of Delaware No Drawing. Application August 6, 1936, Serial No. 94,634

4 Claims. (Cl. 8—44)

This invention relates to dyeing, to improved methods and compositions for the preparation of and the dyeing with insoluble azo dyes, and especially to improvements in stabilized dye compositions.

In the art of dyeing fibres with developed azo dyes, it is common to print the fabric with a paste which contains the coupling component and the azo component of the dye. The azo component is generally made potentially reactive by combining it with a stabilizer so that the components will not react with each other and both are added in admixture to make a composition that is alkaline or non-acid. This composition may desirably be made suitable for use as a printing material by adding a viscous thickener and other ingredients. The coupling component may be, for example, an o-hydroxy-aryl-carboxylic acid or a compound containing an active methylene group capable of combining with the azo component. The azo component may be a diazotized arylamine free from solubilizing groups, such as sulphonic or carboxylic acid groups; and generally may be prepared in a stabilized form as an antidiazotate (nitrosamine) derivative or a diazoimino derivative. When the components are not intended to be reacted immediately with each other to form an insoluble azo dye, the composition containing the components is made non-acid or alkaline, for example by addition of an alkaline aqueous solution of a volatile or fixed alkali, such as sodium hydroxide. A composition thus stabilized against reaction, such as a printing paste containing the coupling and azo components may be printed from an engraved copper roll on piece goods and the color is developed on the fiber by subsequent treatment with hot dilute acid. The printing paste may be prepared in general by dissolving the coupling component and azo component in an organic solvent such as methyl alcohol, ethyl alcohol, a mono-ether of ethylene-glycol or of diethylene-glycol, making the composition alkaline with dilute caustic soda, and then adding a viscous thickener such as starch-tragacanth. Other assistants, such as Turkey red oil, thiodiglycol, urea, etc., may be added. In practice, it has been found advantageous to prepare stock solutions containing the coupling and azo components for conversion to the printing pastes as required for the printing process, especially where the azo component is of the diazo-imino type. However, these solutions are relatively unstable, becoming turbid on long standing and there may be slow hydrolysis of the diazo-imino compound resulting in the formation of dye particles. After these solutions have been stored they usually produce duller shades than the freshly prepared solutions.

It has been discovered that in solutions containing the azo component in the form of diazo-imino derivatives and coupling components of the active methylene group type such as aceto-acetyl-p-phenetidine, diaceto-acetyl-o-toluidine, etc. the deterioration of the solutions in storage is inhibited markedly by the incorporation of both urea and an ethanolamine and it is to this discovery that the present invention relates.

This invention has among its objects the preparation of new compositions of matter, improvements in the art of azo dyeing, and the production of novel solutions and printing pastes of improved stability.

Other objects of the invention will be apparent from the following description in the course of which various examples will be mentioned to illustrate, but not to limit the invention.

The objects of the invention are accomplished by incorporating an ethanolamine and urea in an alkaline mixture containing a coupling component of the active methylene type and a diazo-imino derivative or other azo component stabilized against reaction with the coupling component in non-acid medium. It is desirable that the solution or paste contain a water-miscible solvent, such as alcohol or a mono-ether of ethylene-glycol or diethylene-glycol, examples being methyl alcohol, ethyl alcohol, mono-methyl-ether of ethylene-glycol or of diethylene glycol. A sulfonated oil also may be present.

This invention will be more fully understood by reference to the following examples, in which all quantities are stated in parts by weight, but it is not intended to be limited thereby:

Example I

A solution of the following composition:

| | Parts |
|---|---|
| Aceto-acetyl-p-phenetidine | 77.8 |
| Diazoimino derivative obtained by condensing diazotized 4-chloro-2-amino-anisole with methyl-glucamine | 128.0 |
| Mono-ethyl-ether of ethylene-glycol (Cellosolve) | 200.0 |
| Triethanolamine | 45.0 |
| Sodium hydroxide 100% (added as a 30% water solution) | 21.0 |
| Urea | 45.0 |
| Water (including water in caustic solution) | 483.2 |
| | 1000.0 | was prepared by slurrying the aceto-acetyl-p-phenetidine in the Cellosolve, adding 200 parts of water, adding the triethanolamine and then the sodium hydroxide solution while agitating. The diazomino derivative, urea and the remainder of the water then were added and the stirring continued until a clear solution was obtained. After adding 5 parts of a finely divided siliceous clarifying agent known as Filtercel and 3 parts of a carbonaceous clarifying agent, known as Nuchar, the mixture was filtered.

A printing paste of the composition

| | Parts |
|---|---|
| Above solution | 20 |
| Water | 20 |
| Starch-tragacanth thickener | 60 | was printed on cotton goods from an engraved copper roll in the usual manner. After drying, the dye was developed by aging the piece goods in an acid ager by contact with the vapors from a boiling solution of acetic acid and formic acid. After soaping, rinsing and drying, a printed pattern of a bright yellow shade was obtained, due to the hydrolysis of the diazoimino derivative to free diazo base and subsequent coupling with the aceto-acetyl-p-phenetidine on the fiber to form a dye of the following structure:

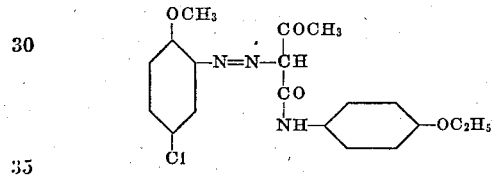

When the above described solution was stored for several weeks at 50° C., it contained noticeably less sediment than a similar solution containing no triethanolamine and urea which was stored under identical conditions and the subsequent print tests resulted in stronger and brigher dyeings.

*Example II*

Similar results were obtained from solutions made in accordance with Example I except that it contained 110 parts of the diazoimino derivative which was obtained by condensing diazotized 4-chloro-2-amino-anisole with piperidine-α-carboxylic-acid instead of the diazoimino derivative described therein.

*Example III*

A solution in which the aceto-acetyl-p-phenetidine was displaced by 67 parts diaceto-acetyl-tolidine was prepared as in Example I. The stability to storage at 50° C. was superior to that of similar solutions not containing triethanolamine and urea and subsequent print tests resulted in brighter and stronger prints.

*Example IV*

Solutions containing 124 parts of the diazoimino derivative obtained by condensing diazotized 4-chloro-2-amino-toluene with piperidine-α-carboxylic-acid and 77.8 parts of diaceto-acetyl-tolidine-sulfone were prepared as in Example I. In storage at 50° C. the stability of the solutions was superior to that of similar solutions not containing the triethanolamine and urea, and subsequent print tests resulted in brighter and stronger prints.

As it is evident that the solutions of the present invention may vary greatly in composition, the component parts may be discussed briefly. The primary arylamines as a class in the form of their diazoamino derivatives may be used as the azo components. The following examples are illustrative:

2:5-dichloro-aniline
4-chloro-2-amino-anisole
4-chloro-2-amino-toluene
α- and β-Naphthylamine
Dianisidine
m-Chloro-aniline
2-amino-diphenyl
a-Amino-anthraquinone
2-amino-anisole-4-sulfon-diethyl-amide
3-benzoyl-amino-4-methoxy-aniline Likewise, a great number of stabilizing agents may be used in the preparation of the diazoamino derivatives of the arylamines, among which the following are mentioned as illustrative.

Sarcosine
Ethyl taurine
Methyl-glucamine
Piperidine-α-carboxylic-acid
Proline
4-sulfo-2-amino-benzoic-acid
Butyl-amino-acetic-acid The coupling components of this invention are preferably the coupling components of the active methylene type of which the following examples are illustrative.

Di-aceto-acetyl-o-tolidine
Aceto-acetyl-p-phenetidine
Di-aceto-acetyl-tolidine-sulfone
Di-benzo-acetyl-o-tolidine
Di-aceto-acetyl-1:4-naphthylene-diamine
Di-aceto-acetyl-4:4′-diamino-3:3′-di-tolyl-methane
Di-aceto-acetyl-4:4′-diamino-diphenyl-urea
Aceto-acetyl-dehydro-thiotoluidine
Terephthaloyl-bis-acetic-acid-p-toluidide It is preferable that the solution contain a water-miscible alcohol or a mono-ether of ethylene-glycol or of diethylene-glycol, for example methyl alcohol, ethyl alcohol, mono-ethyl-ether of ethylene glycol. Varying amounts of caustic may be used, the essential being that the solution shall be sufficiently non-acid to prevent the formation of insoluble dye until the developing acid is applied.

Tri-ethanolamine is a suitable and satisfactory ethanolamine but other ethanolamines, such as mono-ethanolamine, di-ethanolamine and mixtures of the ethanolamines can be used. The reason for the peculiar action of the urea-ethanolamine component which is not produced by either member of the component when used alone, is not fully understood. However the described beneficial result is obtained when the proportions of the members of the component are varied within wide limits, and when the proportion of the component in the solution or printing paste is widely varied. As the benefits result only when both the urea and the ethanolamine are present and relatively large or relatively small amounts of the component may be present, it is evident that many varied embodiments of the invention can be made.

As other embodiments of the invention will be suggested to those skilled in the art without departing from the spirit and scope of the invention, no limitations are intended in the annexed claims, except such as are specifically expressed or are imposed by the prior art.

I claim:

1. A hydrous dyeing composition which comprises an azo dye coupling component having an active methylene group, a component consisting of a diazotized aryl amine which is stabilized against reaction with the coupling component, and an inhibitor consisting of urea and an ethanolamine, said composition being sufficiently non-acetic to prevent the coupling of said components until a developing acid is applied thereto.

2. A hydrous alkaline dyeing composition which comprises an inhibitor consisting of urea and an ethanolamine; an organic solvent from the group consisting of water soluble aliphatic alcohols, diethylene glycol and the mono-ethers of ethylene glycol; an azo dye coupling component having an active methylene group; and a component consisting of a diazotized aryl amine which is stabilized against reaction with the coupling component, said composition being sufficiently non-acidic to prevent immediate coupling of said components until a developing acid is applied thereto.

3. The method of preventing premature reaction in a composition containing an azo dye coupling component which contains an actve methylene group and a potentially reactive diazotized primary aryl amine which comprises adding urea and an ethanolamine, and combining in the composition a basic compound to make the composition non-acidic.

4. The method of preventing premature reaction in a composition containing an azo dye coupling component which contains an active methylene group and a potentially reactive diazotized primary aryl amine which comprises adding urea and triethanolamine, and combining in the composition a basic compound to make the composition non-acidic.

ROBERT E. ETZELMILLER.